W. N. REED.
FLOWER STAND.
APPLICATION FILED OCT. 12, 1917.

1,300,775. Patented Apr. 15, 1919.

INVENTOR.
William N. Reed
BY Walton Harrison,
his ATTORNEY

UNITED STATES PATENT OFFICE.

WILLIAM N. REED, OF HACKENSACK, NEW JERSEY.

FLORAL STAND.

1,300,775.  Specification of Letters Patent.  Patented Apr. 15, 1919.

Application filed October 12, 1917. Serial No. 196,120.

*To all whom it may concern:*

Be it known that I, WILLIAM N. REED, a citizen of the United States, residing at Hackensack, in the county of Bergen and State of New Jersey, have invented certain new and useful Improvements in Floral Stands, of which the following is a full, clear, and exact description.

My invention relates to floral stands of a type specially adapted for use at funerals, and designated in this art as "gates ajar."

Reference is made to the accompanying drawing forming a part of this specification, and in which like figures indicate like parts.

Figure 1:
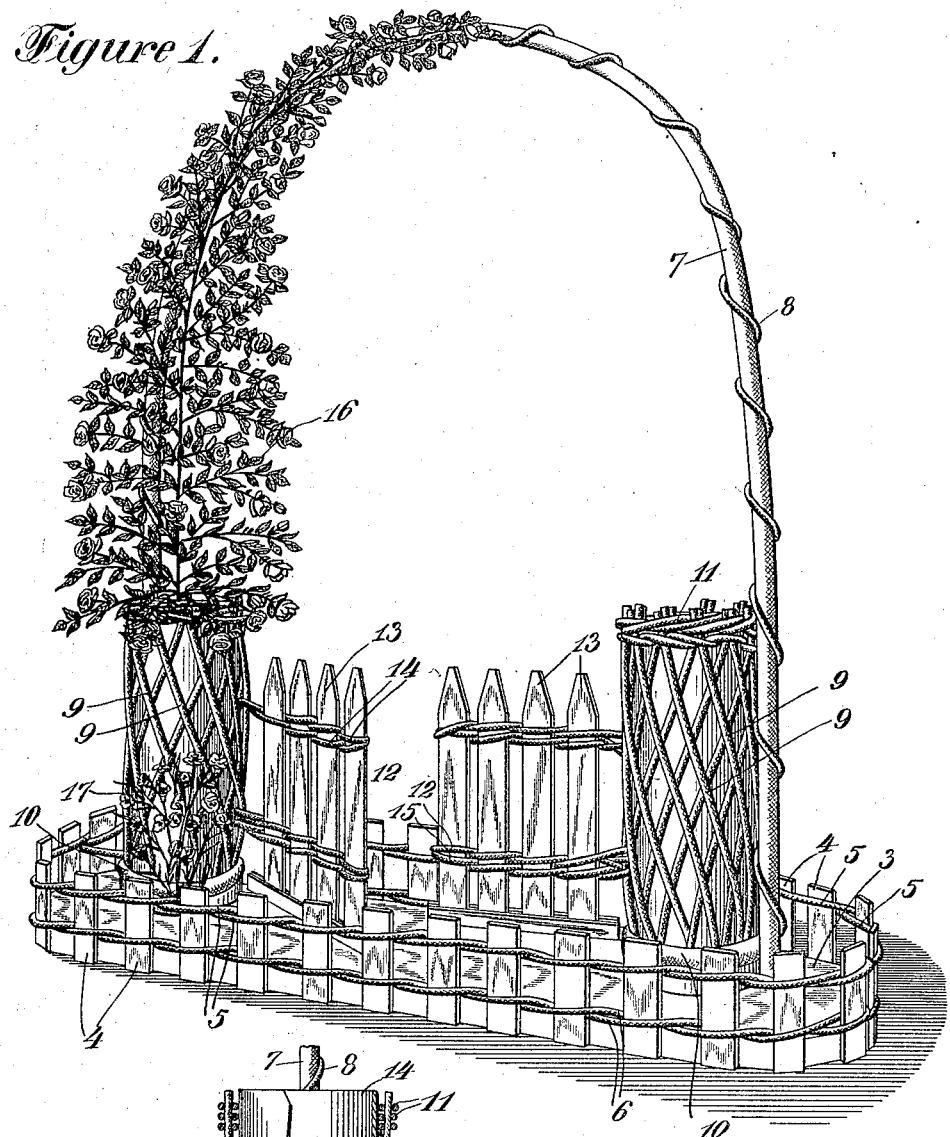
Figure 1 is a perspective of the floral stand, showing a portion only of the flowers in position.

A base board is shown at 3 and has a general elliptical form. A number of pickets 4 are each at its bottom secured to the edge of the base board.

Wicker bonds are shown at 5, 6, and are used for holding the pickets in proper alinement. For this purpose the wicker bonds 5 are crossed back and forth, so as to hold the upper portions of the pickets and the wicker bonds 6 are similarly crossed back and forth, so as to hold the lower portions of the pickets. This arrangement gives the pickets more or less flexibility coupled with strength and they present an elegant appearance.

A wicker rod 7 having the general form of a wicket is at its ends secured to the base board, and a wicker rod 8, considerably smaller in cross section than the rod 7, is twined around the body of the rod 7. The rods 7 and 8 together have the form of an arch, and may be used as a handle.

A pair of wicker cylinders are shown at 9, each being provided with an annular base 10. Each wicker cylinder is provided at its upper end with a rim or border 11, made of wicker rods bent around and interwoven with the material of the wicker cylinders.

A pair of gates 12 are each made of pickets 13, the latter being lashed together by wicker rods 14, crossed and recrossed so as to hold the pickets 13. The gates are ajar, that is, slightly open.

Figure 2:
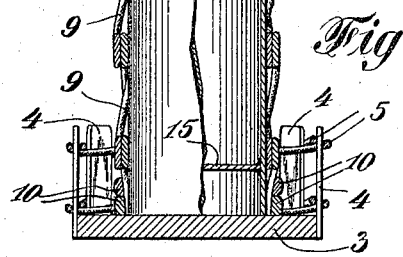
Fig. 2 is a sectional view of one of the reservoirs and the wicker basket associated therewith, forming a part of the device.

Two water tanks are shown at 14, and are each of substantially cylindrical form. Each tank is provided with a raised bottom 15, having the form of a disk, and secured preferably by solder, as indicated in Fig. 2. Each water tank is removable for the purpose of enabling it to be emptied and refilled.

Flowers 16 are secured to the wicker rod 7 and so arranged that their stems extend into the tanks which are filled with water. These are natural flowers, and may be kept fresh for days at a time.

Other flowers are shown at 17, and may be held in position by merely thrusting their stems through the wickerwork. These last mentioned flowers may be either natural or artificial.

Heretofore the custom has been to use either artificial flowers altogether, or else employ natural or cut flowers under such conditions that they would soon wilt and droop.

By my improved device, however, natural or cut flowers can be made to retain their natural freshness for a sufficient length of time for all practical purposes.

I claim:—

1. In a device of the character described the combination of a base board, a handle secured thereto and having the general form of an arch, a pair of flower retaining wicker cylinders mounted upon said base board and secured to said handle, and a pair of water tanks removably mounted within said wicker cylinders, for the purpose of supporting flowers and supplying the stems thereof with water.

2. A device of the character described, comprising a base board, a flower retaining wicker handle having the general form of an arch and having its ends connected to said base board, a pair of flower retaining wicker cylinders mounted upon said base board and spaced apart, each of said wicker cylinders being secured to an adjacent portion of said arch and partially supported thereby, and a pair of metallic tanks removably mounted within said wicker cylinders, each tank having the proximate form of a cylinder and being adapted to hold water.

WILLIAM N. REED.

Copies of this patent may be obtained for five cents each, by addressing the "Commissioner of Patents, Washington, D. C."